Patented Sept. 25, 1934

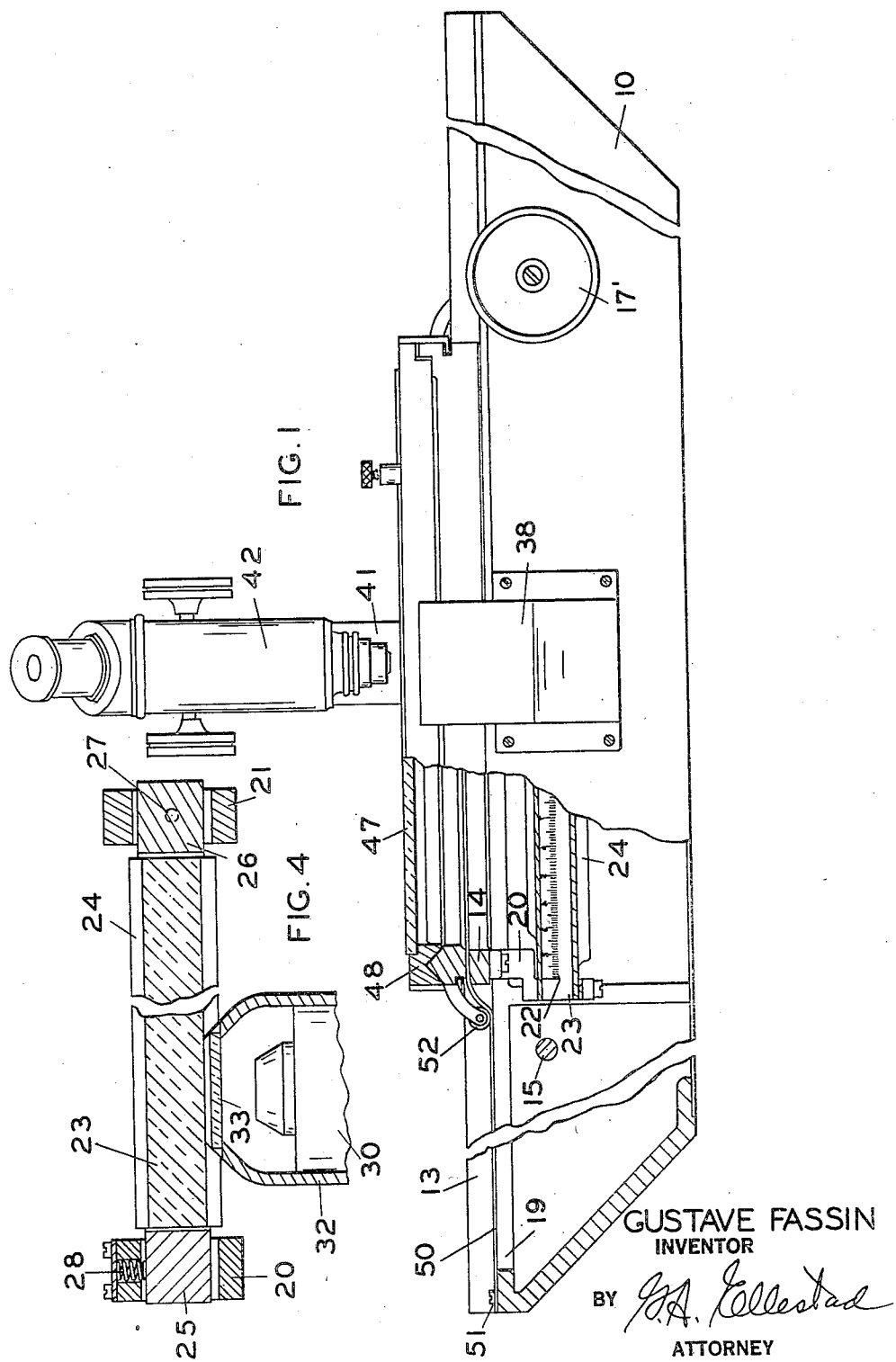

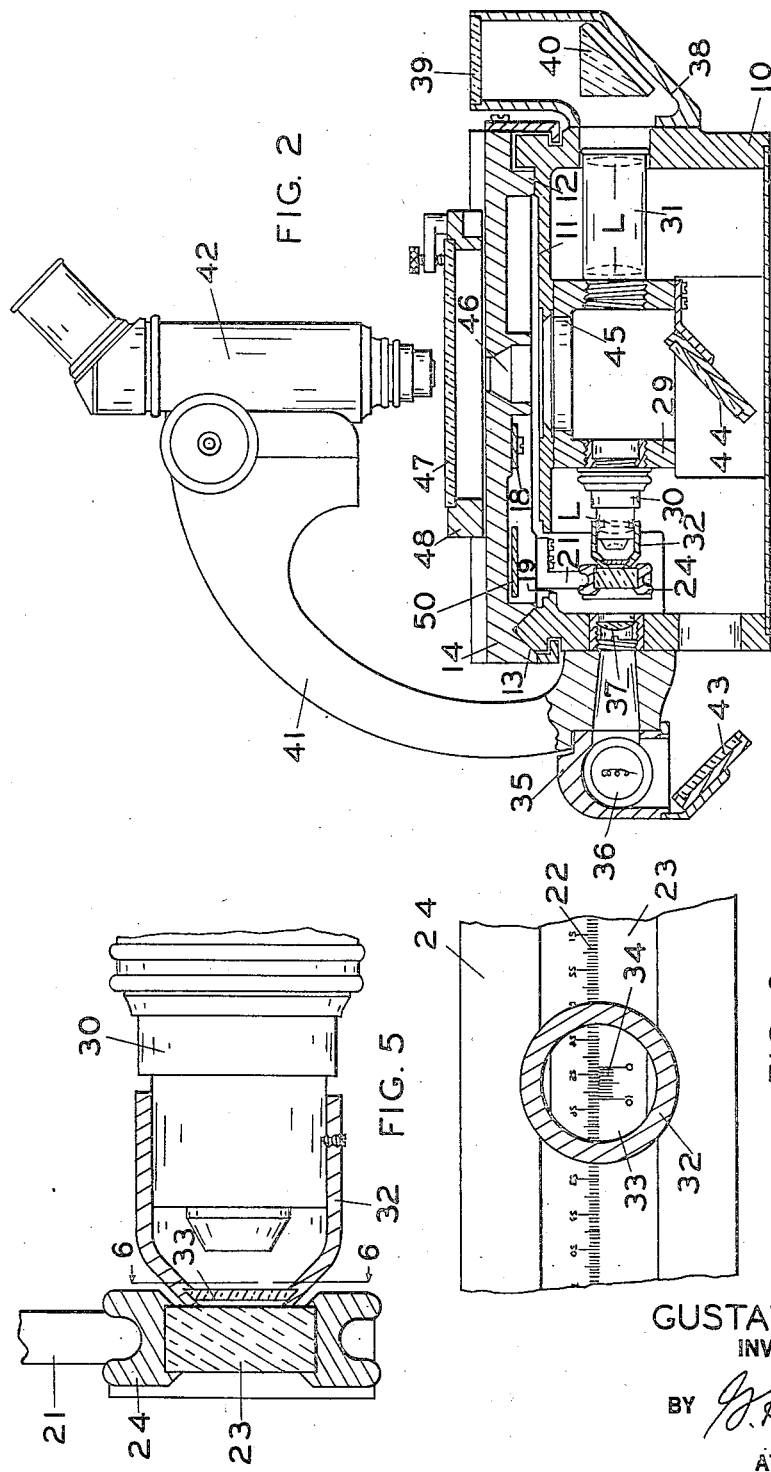

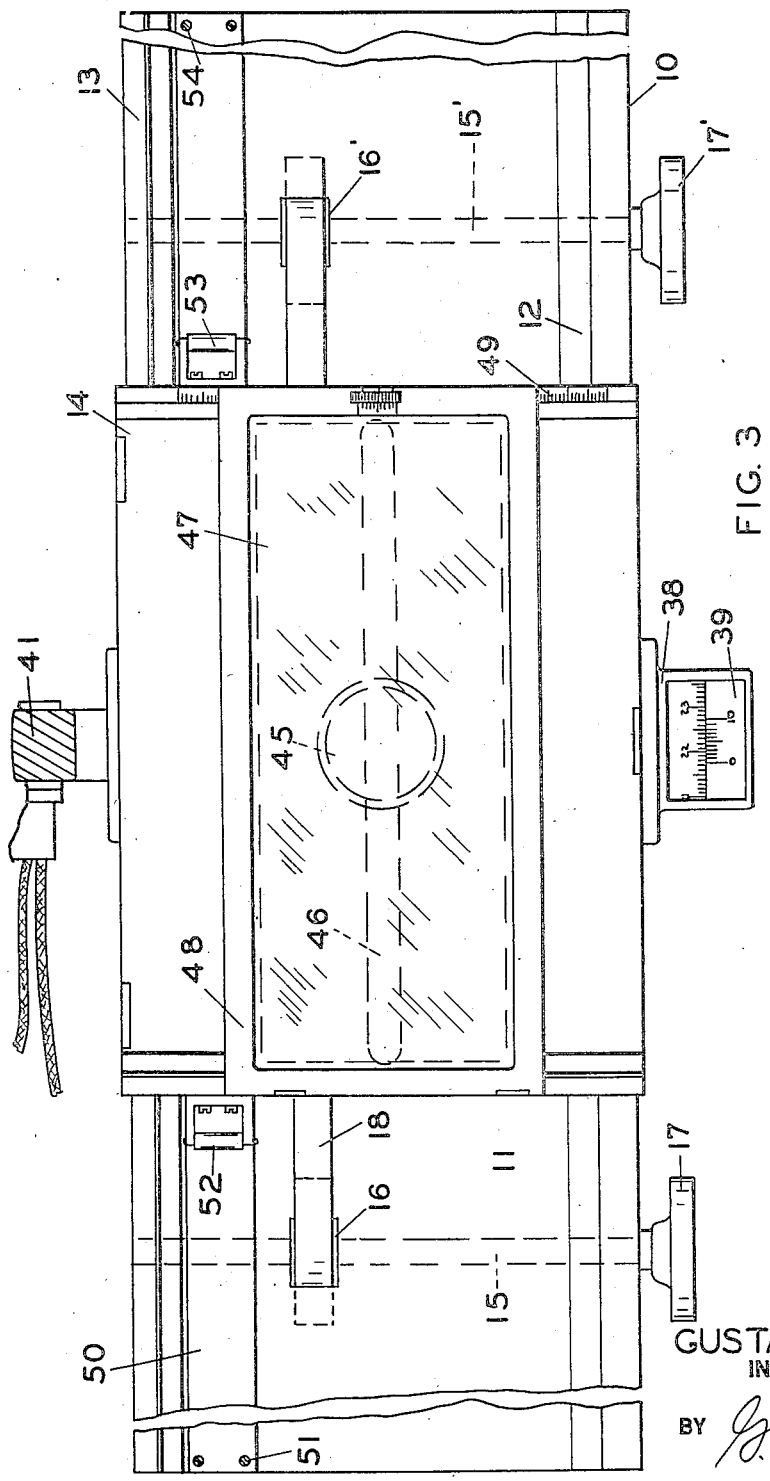

1,974,606

UNITED STATES PATENT OFFICE 1,974,606

MEASURING MICROSCOPE

Gustave Fassin, Irondequoit, N. Y., assignor to Bausch & Lomb Optical Company, Rochester, N. Y., a corporation of New York Application November 7, 1931, Serial No. 573,531

16 Claims. (Cl. 88—24)

This invention relates to measuring devices and more particularly it has reference to devices known as measuring microscopes whereby accurate measurements can be made with the aid of a microscope.

One of the objects of this invention is to provide an improved measuring microscope which will be relatively simple in structure, yet accurate, convenient and efficient in operation. Another object is to provide a measuring microscope having a screen onto which is projected an enlarged image of a scale which is secured to the movable table of the instrument. Another object is to provide a measuring microscope having a movable table and improved scale means for indicating the movement of said table. A further object is to provide a measuring microscope in which a single light source is used for illuminating the scale and also a transparent object which is being measured. Still another object is to provide improved means for mounting a scale and vernier in a measuring device of the type described. These and other objects and advantages reside in certain novel features of construction, arrangement and combination of parts as will hereinafter be more fully described and pointed out in the appended claims.

In one common type of measuring microscope the mircoscope is moved by means of a micrometer screw and in another type the stage is moved by a micrometer screw. The accuracy of such instruments is, of course, dependent upon the accuracy of the micrometer screw so that faulty screw construction, back lash and wear of the screw tend to impair the accuracy of the instruments. In another type of instrument a fixed microscope is used for setting on the object and another fixed microscope is used for reading the scale. Operation of such an instrument for a relatively long period of time becomes fatiguing since the operator is required to shift his eye back and forth from one microscope to the other. I have sought to overcome the difficulties and disadvantages of the prior art instruments by providing a device which can be used conveniently to afford measurements of a high degree of accuracy.

Referring to the drawings:

Fig. 1 is a front view of my measuring microscope with parts in section.

Fig. 2 is a vertical sectional view through the base of the instrument.

Fig. 3 is a top plan view of the base.

Fig. 4 is a horizontal sectional view showing the mounting of the scale and vernier.

Fig. 5 is similar view taken in a vertical plane.

Fig. 6 is a view taken on line 6—6 of Fig. 5.

A preferred embodiment of my invention is shown in the drawings wherein 10 indicates a base having a top plate 11 provided with the track portions 12 and 13 on which the table 14 is slidably mounted. Rotatably mounted at the two ends of the base are the two shafts 15 and 15' carrying, respectively, the pulleys 16 and 16' and the hand wheel 17 and 17'. One end of a flexible steel tape 18 is secured to one edge of table 14 and then passes around pulley 15 and over and around pulley 15' and the other end of the tape is attached to the opposite edge of table 14. Hence, it will be apparent that the table 14 may be moved back and forth by turning hand wheels 17 and 17'.

The top plate 11 has a longitudinal slot 19 through which extend the depending brackets 20 and 21 which are secured at opposite edges of table 14. Suitable scale divisions 22 are engraved on the rear side of a relatively long strip of glass 23 which is mounted within a metal frame 24 having the two ears 25 and 26 extending outwardly at the two respective ends of the frame. The ear 26 is pivotally mounted to turn about a vertical axis as at 27 on bracket 21 and the ear 25 is yieldably engaged by a coil spring 28 carried by bracket 20, for a purpose to be hereinafter explained.

Secured to the under side of plate 11 is a casing 29 which supports the mountings 30 and 31 carrying cooperating lens elements L. The mounting 30 carries a support 32 on which is mounted a glass member 33 having a vernier scale 34 engraved on one of its surfaces. The front surface of glass member 23 is urged into contact with the support 32 by spring 28 so that the member 23 and support 32 are held in yielding contact while still permitting the glass member to slide along as the table 14 is moved. At the rear of the base 10 there is mounted a housing 35 containing a light source 36 from which light rays pass through lens 37 to illuminate the scale and the vernier. Mounted on the front of base 10 is a housing 38 carrying a horizontally disposed ground glass screen 39 onto which images of the illuminated scale and vernier are projected by means of the lens elements L and the cooperating reflecting prism 40.

Fixedly secured to the rear of base 10 is a bracket 41 carrying a microscope 42 having a suitable cross hair or fiducial mark in its eye piece, as is well known to those skilled in the art. Attached to the housing 35 is a reflector 43 which cooperates with reflector 44 to direct light rays from the source 36 upwardly through the opening 45 in plate 11 and the slot 46 in table 14. Hence, when a diaphanous object such as a spectrogram 47 is being examined, proper illumination will be provided so as to enable the accurate setting of the cross hair on the object. The spectrogram 47 is preferably mounted on a carriage 48 which is slidably mounted on table 14 and adapted to move at right angles to the direction of travel of the table 14, the movement of the carriage being indicated by a scale 49.

In order to prevent dust and other foreign matter from falling onto the scales, a flexible steel tape 50 is positioned so as to cover slot 19. One end of the tape 50 is fastened to top plate 11 at 51 from which it extends along the plate 11, under the roller 52, carried by table 14, across the table, under roller 53 and the other end is secured to plate 11 at 54. The tape is loose enough to permit a free and easy movement of table 14. Thus, the exposed portions of slot 19 are always covered and still the table 14 can be freely moved along its track.

In operation, an object such as a spectrogram 47 is placed on carriage 48 and the light source 36 is lighted so as to illuminate the scales and the portion of the spectrogram in the field of the microscope. The table 14 is adjusted so that the cross hair in the microscope is set on a desired line on the spectrogram. The position of this line is then noted on the screen 39 which bears images of both the scale and the fixed vernier and these images appear on the screen as shown in Fig. 3. The table 14 is then moved until another desired line coincides with the cross hair and the position of this line is obtained by referring to the screen 39. In case it is desired to measure the linear distance between two points on opaque material, such as a piece of metal, the object is suitably illuminated from above. Suitable gears or other devices can, of course, be applied to the table moving mechanism so as to provide a fine adjustment to facilitate the setting of the cross hair on a desired object.

From the foregoing it will be apparent that I am able to attain the objects of my invention and provide an improved measuring microscope which can be conveniently used for making accurate linear measurements. The scale of my instrument can be accurately engraved on glass. The scale is not subjected to wear and the accuracy of the instrument is not dependent upon the accuracy of a micrometer screw. Enlarged images of both the scale and the fixed vernier are projected onto the screen which is located in front of the setting microscope, thereby affording great convenience in operation. Various modifications can obviously be made without departing from the spirit of my invention.

I claim:

1. A measuring device comprising a base, a table mounted for linear movement on said base for carrying an object to be measured, a linear scale attached to said table, a screen mounted on the base and means for projecting an image of said scale onto said screen.

2. A measuring device of the type described comprising a base, a table mounted for linear movement on said base for carrying an object to be measured, a linear scale secured to said table, a vernier fixedly mounted adjacent to said scale, a screen mounted on said base and means for projecting images of said scale and vernier onto said screen.

3. A measuring device having in combination a base, a table movably mounted on said base, a scale mounted on said table, a support carried by said base, a vernier mounted on said support adjacent to said scale, yieldable means for urging said scale and support into contact and optical means carried by said base for producing images of said scale and vernier.

4. A device of the character described comprising a base, a table movably mounted on said base, means for moving said table, said means comprising rotatable pulleys and a flexible tape, a scale secured to said table, a screen and projecting means for producing an image of a portion of said scale on said screen.

5. A measuring device comprising a base, a table movably mounted on said base, a scale mounted on said table, a microscope secured to said base, a light source for illuminating said scale, means for reflecting light rays from said source into said microscope, a screen mounted on said base and means for projecting an image of said scale onto said screen.

6. A measuring device of the type described comprising a base, a table slidably mounted for horizontal movement on said base, a diaphanous scale mounted on said table and movable therewith, a light source mounted on said base behind said scale, a horizontally disposed screen mounted at the front of said base and optical means below the plane of said table for projecting an image of said scale onto said screen.

7. In a measuring device, the combination of a base having a top plate provided with a slot, a table slidably mounted on said plate, a scale secured to said table and movable therewith, said scale extending downwardly through said slot, said slot being longer than said table and means for covering the exposed portions of said slot while still permitting movement of said table.

8. In a measuring device, the combination of a base having a top plate provided with a slot, a table slidably mounted on said plate over said slot, a bracket secured to said table, said bracket projecting through said slot, a scale carried by said bracket, a flexible tape secured to said plate, said tape extending along said slot and over said table whereby the slot is covered and the table is adapted to be moved.

9. In a measuring device, the combination of a member bearing a scale, said member being pivotally mounted, a support carrying a vernier adjacent to said scale and wieldable means for urging said member into contact with said support.

10. A measuring device comprising a base, a table slidably mounted on said base, diaphanous scale means carried by said table, a microscope fixedly mounted on said base, a light source mounted on said base behind said scale means, a screen mounted on the front of said base, optical means for producing an enlarged image of said scale means on said screen and means for directing light rays from said source along the optical axis of said microscope.

11. In an optical instrument the combination of a base having an opening, a member movably mounted on said base above said opening, an element secured to said member and projecting into said opening, said opening having a greater dimension than the member in the direction of the movement of the member and means for covering the portions of the opening which are not covered by the member while still permitting movement of the member in either direction, said means comprising a flexible tape member secured to said base.

12. A measuring device comprising a base, a table for carrying an object to be measured, said table being movably mounted on the base, scale means mounted on said table, a microscope fixedly mounted on said base and positioned above said table, an image receiving surface mounted on said base in front of said microscope and optical means for projecting an image of said scale means onto said surface.

13. A measuring device of the character described comprising a base, a table for carrying an object to be measured, said table being movably mounted on said base, scale means fixedly secured to said table and movable therewith, fiducial line means fixedly secured to said base and positioned above said table, a vernier mounted on said base adjacent to said scale means, a screen and optical means for projecting images of said scale means and vernier onto said screen.

14. A measuring device comprising a base, a table slidably mounted on said base for carrying an object to be measured, scale means mounted on said table and extending downwardly therefrom, a screen mounted near the top of said base and optical means below the plane of said table for projecting an image of said scale onto said screen.

15. A measuring device comprising a base having a top plate provided with a slot, a table for carrying an object to be measured, said table being slidably mounted on said plate, scale means fixedly secured to said table and projecting downwardly through said slot, vernier scale means fixedly mounted adjacent to said first named scale means, means for illuminating both of said scale means, an image receiving surface carried by said base and optical means for projecting images of said scale means onto said surface.

16. A measuring instrument comprising a base having a horizontally disposed track, a member slidably mounted on said track, a linear scale secured to and depending from said member, a light source positioned below the plane of said member and arranged to illuminate a portion of said scale, an optical system positioned with its axis substantially at right angles to said scale, a horizontally disposed screen mounted on one side of said base, a reflector mounted below said screen in position to receive and direct onto said screen light rays which pass from the illuminated portion of the scale through said optical system.

GUSTAVE FASSIN.

CERTIFICATE OF CORRECTION.

Patent No. 1,974,606.  September 25, 1934.

GUSTAVE FASSIN.

It is hereby certified that error appears in the printed specification of the above numbered patent requiring correction as follows: Page 2, line 128, claim 9, for "wieldable" read yieldable; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.